(12) United States Patent
Hutchings et al.

(10) Patent No.: US 9,223,888 B2
(45) Date of Patent: Dec. 29, 2015

(54) COMBINING CLIENT AND SERVER CLASSIFIERS TO ACHIEVE BETTER ACCURACY AND PERFORMANCE RESULTS IN WEB PAGE CLASSIFICATION

(76) Inventors: Bryce Hutchings, Kirkland, WA (US); Wei Jiang, Redmond, WA (US); Vladimir Rovinsky, Redmond, WA (US)

( * ) Notice: Subject to any disclaimer, the term of this patent is extended or adjusted under 35 U.S.C. 154(b) by 85 days.

(21) Appl. No.: 13/228,424

(22) Filed: Sep. 8, 2011

(65) Prior Publication Data

US 2013/0067590 A1 Mar. 14, 2013

(51) Int. Cl.
*G06F 17/30* (2006.01)
*G06F 21/24* (2006.01)

(52) U.S. Cl.
CPC .................... *G06F 17/3089* (2013.01)

(58) Field of Classification Search
CPC .. G06F 17/3089; G06F 17/30038; G06F 3/14
USPC ............. 713/152, 154, 168; 726/1–7, 12–14, 726/22–30; 386/261, 262; 709/224–226, 709/229; 725/30, 34, 35, 46; 715/747; 707/748
See application file for complete search history.

(56) References Cited

U.S. PATENT DOCUMENTS

| | | | |
|---|---|---|---|
| 6,675,162 B1 | 1/2004 | Russell-Falla et al. | |
| 7,266,559 B2 | 9/2007 | Cook et al. | |
| 7,437,772 B1* | 10/2008 | Thenthiruperai et al. | 726/30 |
| 7,636,777 B1* | 12/2009 | Harada et al. | 709/223 |
| 7,886,043 B1* | 2/2011 | Chan et al. | 709/224 |
| 7,974,994 B2* | 7/2011 | Li et al. | 707/810 |
| 8,032,923 B1* | 10/2011 | Li et al. | 709/224 |
| 8,095,602 B1* | 1/2012 | Orbach | 709/206 |
| 8,229,930 B2* | 7/2012 | Cohen et al. | 707/737 |
| 8,281,361 B1* | 10/2012 | Schepis et al. | 726/1 |
| 2003/0225763 A1* | 12/2003 | Guilak et al. | 707/7 |
| 2005/0021796 A1* | 1/2005 | McClain et al. | 709/229 |
| 2005/0050222 A1* | 3/2005 | Packer | 709/238 |
| 2005/0132042 A1* | 6/2005 | Cryer | 709/224 |
| 2006/0005148 A1* | 1/2006 | Cheng et al. | 715/808 |
| 2008/0040748 A1* | 2/2008 | Miyaki | 725/34 |
| 2008/0163380 A1* | 7/2008 | Liu | 726/28 |
| 2009/0007102 A1* | 1/2009 | Dadhia et al. | 718/1 |
| 2009/0216868 A1* | 8/2009 | Gao et al. | 709/223 |
| 2010/0050273 A1* | 2/2010 | Liu | 726/28 |
| 2010/0251291 A1* | 9/2010 | Pino et al. | 725/34 |
| 2010/0262615 A1 | 10/2010 | Oztekin et al. | |
| 2010/0268776 A1* | 10/2010 | Gerke | 709/204 |
| 2010/0299735 A1* | 11/2010 | Jiang | 726/7 |
| 2011/0145435 A1* | 6/2011 | Bhatawdekar et al. | 709/238 |
| 2011/0185436 A1* | 7/2011 | Koulinitch et al. | 726/28 |

(Continued)

OTHER PUBLICATIONS

Marcos Forte et al, A Content Classification and Filtering Server for the Internet, pp. 1166-1171, ACM, 2006.*

(Continued)

*Primary Examiner* — Shanto M Abedin
(74) *Attorney, Agent, or Firm* — John Jardine; Judy Yee; Micky Minhas (57) ABSTRACT

In one embodiment, an internet monitor service may use a final content rating to determine access to a webpage. A monitor client 102 may generate a client content rating of a webpage 104. The monitor client 102 may factor the client content rating with a server content rating of the webpage 104 to determine a final content rating for the webpage 104.

20 Claims, 6 Drawing Sheets

(56) References Cited

U.S. PATENT DOCUMENTS

| | | | |
|---|---|---|---|
| 2012/0010927 A1* | 1/2012 | Attenberg et al. | 705/14.4 |
| 2012/0017281 A1* | 1/2012 | Banerjee et al. | 726/25 |
| 2012/0167231 A1* | 6/2012 | Garcia et al. | 726/27 |
| 2012/0210435 A1* | 8/2012 | Niemela | 726/26 |

OTHER PUBLICATIONS

Monther Aldwairi et al, MALURLs: Malicious URLs Classification System, 2011.*

Muntean, et al., "A Client-Orientated Dynamic Web Server", Retrieved at <<http://citeseerx.ist.psu.edu/viewdoc/download?doi=10.1.1.28.8380&rep=rep1&type=pdf>>, Retrieved Date: Jul. 27, 2011, pp. 6.

Mason, Jane E., "An N-Gram Based Approach to the Automatic Classification of Web Pages by Genre", Retrieved at <<http://dalspace.library.dal.ca/bitstream/handle/10222/12351/thesis_16_12_09.pdf?sequence=2>>, Dec. 10, 2009, pp. 172.

Jain, et al., "Classification-Based Retrieval Methods to Enhance Information Discovery on the Web", International Journal of Managing Information Technology (IJMIT), vol. 3, No. 1, Retrieved at <<http://airccse.org/journal/ijmit/papers/3111ijmit03.pdf>>, Feb. 2011, pp. 33-44.

Loia, et al., "An Evolutionary Approach to Automatic Web Page Categorization and Updating", Retrieved at <<http://Ivk.cs.msu.su/~bruzz/articles/classification/An%20Evolutionary%20Approach%20to%20Automatic%20Web.pdf>>, Proceedings of the First Asia-Pacific Conference on Web intelligence: Research and Development, 2001, pp. 292-302.

* cited by examiner

Figure 2

| WEBPAGE ID 310 | SERVER CONTENT RATING 320 | SERVER CONFIDENCE SCORE 330 |

COMBINING CLIENT AND SERVER CLASSIFIERS TO ACHIEVE BETTER ACCURACY AND PERFORMANCE RESULTS IN WEB PAGE CLASSIFICATION

BACKGROUND

A webpage on the internet may have a variety of content. An internet monitor service may classify that content for use by users or web services, such as for parental notification and web advertisement. A proactive internet monitor service may seek out webpages and determine the classification for later use. Alternatively, a reactive internet monitor service may classify a webpage upon access by a user.

For example, a webpage may have adult content, such as extreme violence or graphic sexual situations. A parent may prevent the accidental exposure of a child to these elements by using the internet monitor service. Each time that the child accesses the internet from a computer protected by the internet monitor service, the webpage access by that computer may be scanned to classify content before allowing the content to be viewed.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to an internet monitor service may use a final content rating to determine access to a webpage. A monitor client may generate a client content rating of a webpage. The monitor client may factor the client content rating with a server content rating of the webpage to determine a final content rating for the webpage.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or an internet monitor service for a computing device.

An internet monitor service may use client and server side classification to provide a more accurate assessment of the content of a webpage. A content rating describes the preponderance of a certain type of content on that webpage. Each content rating may have a confidence score. The confidence score describes the certainty that the internet monitor service has in the content rating.

The client side, referred to as a monitor client, may review the webpage after retrieving the webpage, but before displaying the webpage to the user. The monitor client may use a real-time classifier for the text content, such as hypertext markup language, extensible markup language, and other webpage authoring languages. A text classifier of the webpage text content may have a small memory footprint and low processing use. The monitor client may also use real-time classifier for images. An image classifier may use significant processor and memory resources and may negatively impact user browser experience on less powerful machines. The image classifier may be used judiciously on images that belong to a webpage with an ambiguous content rating. An ambiguous content rating may have a confidence score not high enough to be classified as a category, but not low enough to be definitively classified as not that category.

The server side, referred to as a monitor server, may use techniques and data that have large memory and storage footprints and are impractical for client side use. A monitor server may avoid real-time analysis of the target content and network latency costs. A monitor server may look up through millions of known static webpage classifications. A static webpage classification describes a content category affiliation that is not expected to change over time. If the webpage classification is not known or dynamic, a real-time classification of the requested webpage uniform resource locator may be performed. A dynamic webpage classification describes a content category affiliation that may be likely to change over time. The monitor server may determine a server content rating and a server confidence score and return them to the monitor client.

The monitor client may finalize the content rating in a final content rating factoring in the client content rating and the server content rating. If the client content rating has a high enough client confidence score, the client content rating may overpower the server content rating in the final content rating. Similarly, if the server content rating has a high enough server confidence score, the server content rating may overpower the client content rating in the final content rating.

The internet monitor service may store the client content rating, the server content rating, and the final content rating in a telemetry database for subsequent data mining and ongoing rating review. The internet monitor service may focus on webpages that led to a conflict between the client content rating and the server content rating or to ambiguous content rating results. Both computer applications and human service administrators may perform additional review of these webpages. If a webpage has an ambiguous final content rating, the monitor client may run an additional real time classifier on the webpage to disambiguate the content rating. Additionally, the monitor server may run a post action classifier as part of an after action review process to avoid an ambiguous final content rating in the future. An additional classifier may be an image classifier, a video classifier, an audio classifier, or other classifiers. The monitor server may also execute an after action review process of the client content rating and the server content rating.

Thus, in one embodiment, an internet monitor service may use a final content rating to determine access to a webpage. A monitor client may generate a client content rating of a webpage. A monitor server may generate a server content rating of a webpage. The monitor client may factor the client content rating with a server content rating of the webpage to determine a final content rating for the webpage.

Figure 1:
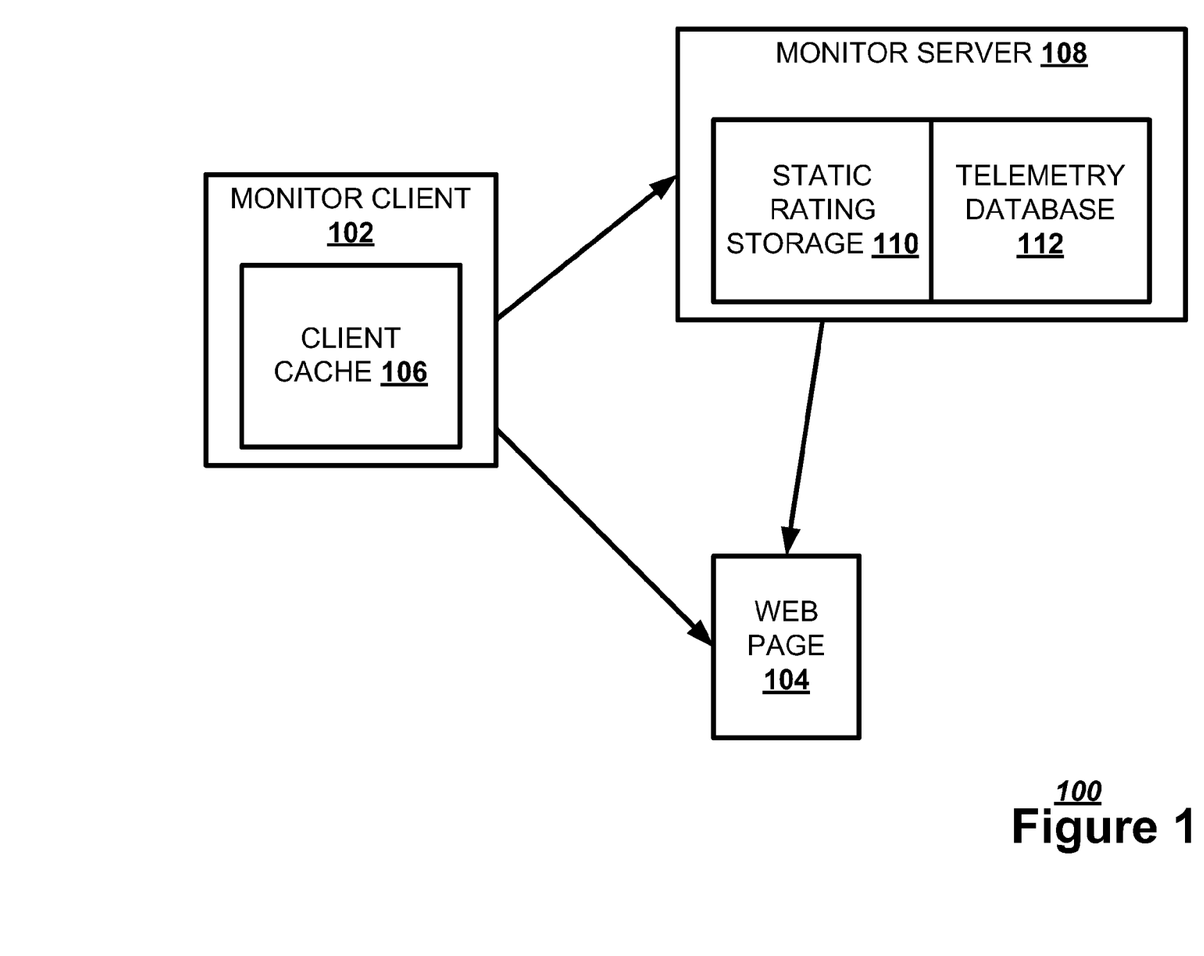
FIG. 1 illustrates, in a block diagram, one embodiment of an internet monitor service

FIG. 1 illustrates, in a block diagram, one embodiment of an internet monitor service 100. A user may use a computer having a web browser with a resident monitor client 102 to access a webpage 104. The monitor client 102 may determine a content rating for the webpage 104. The content rating represents the content present on the webpage 104. Either a service administrator or the guardian user of the computer may set a client per-category threshold that determines the type of content that a monitored user of the computer is allowed to view. A guardian user is the primary responsible party overseeing the computer. The guardian user may be the parent or guardian of the normal user of the computer. If the webpage 104 is a static webpage 104 that the monitor client 102 has previously rated, the monitor client 104 may store a cached content rating for that webpage 104 in a client cache 106.

If the webpage 104 is dynamic or has not been previously visited, the monitor client 102 may generate a content rating. The monitor client 102 may generate a final content rating to represent the webpage 104. The monitor client 102 may generate a client content rating to be factored with a server content rating received from a monitor server 108. Upon receiving a webpage 104 access request from a user, the monitor client 102 may request classification from the monitor server 108 of the webpage 104 and then receive the server content rating. The monitor client 102 may perform a less resource intensive and more specific review, such as a text or image review. The monitor client 102 may review a webpage 104 that implements user authentication, such as a social network page. The monitor server 108 may perform a more resource intensive and less specific review, such as searching a large number of content ratings for a known static sites and reviewing the uniform resource locator of a webpage 104. The monitor server 108 may store a static server content rating for certain known webpages 104 in a static server content rating storage 110. For example, the monitor server 108 may assume that content from www.lego.com is generally allowable for all ages, while content from www.playboy.com is generally adult oriented. The monitor server 108 may periodically check this assumption. The monitor server 108 may also maintain a telemetry database 112 for the purpose of subsequent data mining and ongoing rating review.

Figure 2:
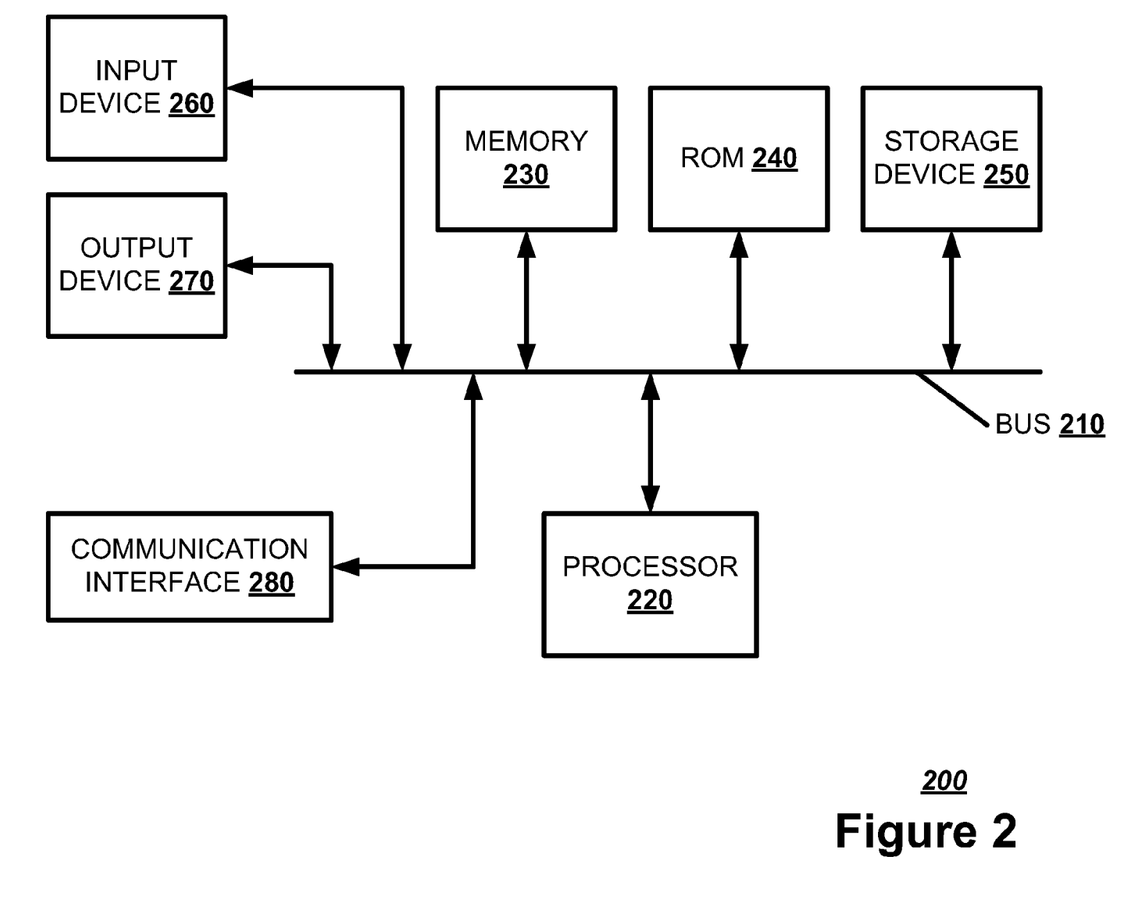
FIG. 2 illustrates, in a block diagram, one embodiment of a computing device.

FIG. 2 illustrates a block diagram of an exemplary computing device 200 which may act as either a monitor client 102 or a monitor server 108. The computing device 200 may combine one or more of hardware, software, firmware, and system-on-a-chip technology to implement an internet monitor service. The computing device 200 may include a bus 210, a processor 220, a memory 230, a read only memory (ROM) 240, a storage device 250, an input device 260, an output device 270, and a communication interface 280. The bus 210 may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The memory 230 may store a content rating for a previously visited webpage 104. The ROM 240 may include a conventional ROM device or another type of static storage device that stores static information and instructions for the processor 220. The storage device 250 may include any type of tangible machine-readable medium, such as, for example, magnetic or optical recording media and its corresponding drive. The storage device 250 may store a set of instructions detailing a method that when executed by one or more processors cause the one or more processors to perform the method. The storage device 250 may also be a database or a database interface for storing a static server content rating and telemetry data.

The input device 260 may include one or more conventional mechanisms that permit a user to input information to the computing device 200, such as a keyboard, a mouse, a voice recognition device, a microphone, a headset, etc. The output device 270 may include one or more conventional mechanisms that output information to the user, including a display, a printer, one or more speakers, a headset, or a medium, such as a memory, or a magnetic or optical disk and a corresponding disk drive. The communication interface 280 may include any transceiver-like mechanism that enables processing device 200 to communicate with other devices or networks. The communication interface 280 may include a network interface or a mobile transceiver interface. The communication interface 280 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the storage device 250, or from a separate device via the communication interface 280.

Figure 3:
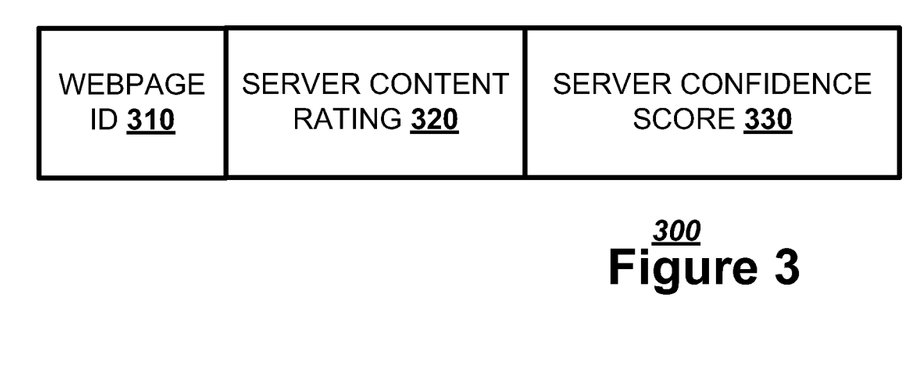
FIG. 3 illustrates, in a block diagram, one embodiment of a server classification response.

The monitor server 108 may transmit a server classification response to a monitor client 102 to indicate a server content rating. FIG. 3 illustrates, in a block diagram, one embodiment of a server classification response 300. The server classification response 300 may have a webpage identifier 310 that identifies the client accessed webpage 104 to which the server content rating refers. The server classification response 300 may have a server content rating 320 describing the amount of that type of content on the webpage 104 as determined by the monitor server 108. The server classification response 300 may have a server confidence score 330 indicating the certainty that the monitor server 108 has in the server content rating 320. If the server content rating 320 is a static server content rating, the server confidence score 330 may be at a maximum. The maximum server confidence score 330 may indicate to the monitor client 102 that the server content rating 320 is a static server content rating 320. For example, if the server confidence score 330 ranges from −1.00 to 1.00, a server confidence score of −1.00 may indicate that webpage content is dynamic and not of the associated category and a server confidence score of 1.00 may indicate that the webpage content is static and of the associated category.

Figure 4:
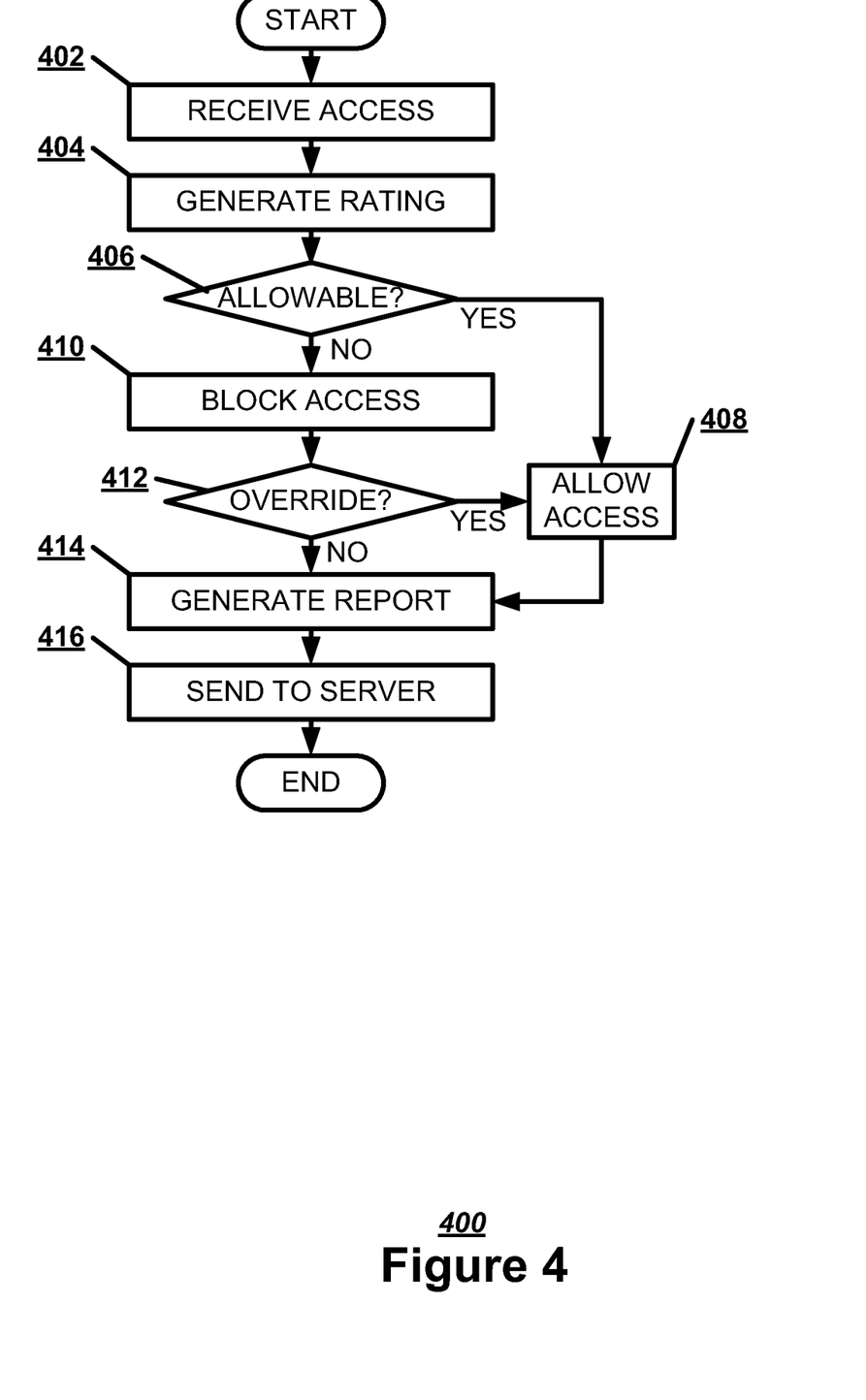
FIG. 4 illustrates, in a flowchart, one embodiment of a method of processing a webpage access at a monitor client.

FIG. 4 illustrates, in a flowchart, one embodiment of a method 400 of processing a webpage 104 access at a monitor client 102. The monitor client 102 may be resident in a web browser. The monitor client 102 may receive from a user an access request for a webpage 104 (Block 402). The monitor client 102 may generate a final content rating for that webpage 104 (Block 404). If the final content rating indicates that the webpage is allowable (Block 406), the monitor client 102 may allow access to the webpage 104 based on the final content rating (Block 408). If the final content rating indicates that the webpage is not allowable (Block 406), the monitor client 102 may block access to the webpage 104 based on the final content rating (Block 410).

If the guardian user overrides the blocked access (Block 412), the monitor client 102 may allow access to the webpage 104 (Block 408). The guardian user may override the final content rating if the internet monitor service made a rating error or if the guardian user simply disagrees with the final content rating, even if accurate.

The monitor client 102 may generate a telemetry report on the final content rating (Block 414). The telemetry report may include the client content rating, the client confidence score, the server content rating, the server confidence score, the final content rating, a user override, or other content rating information. The monitor client 102 may send the telemetry report to the monitor server 108 (Block 416).

Figure 5:
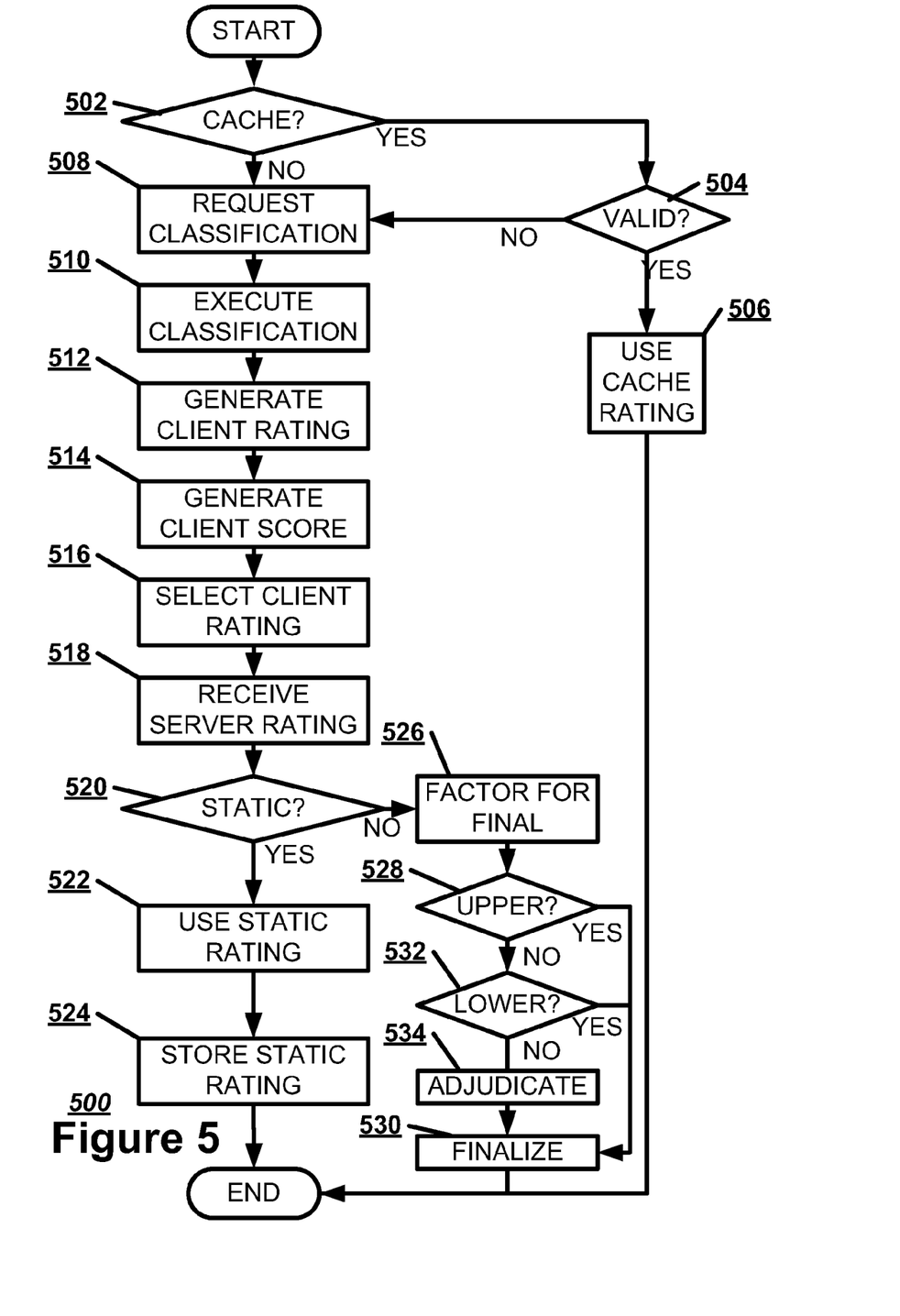
FIG. 5 illustrates, in a flowchart, one embodiment of a method of generating a final content rating at a monitor client.

FIG. 5 illustrates, in a flowchart, one embodiment of a method 500 of generating a final content rating at a monitor client 102. If the client cache 106 has a cached content rating stored for the webpage 104 being accessed (Block 502), and the cached content rating is still within a client cache validity period (Block 504), the monitor client 102 may use the cached content rating as the final content rating (Block 506). The client cache validity period is a period of time during which a cached content rating may be used by a monitor client 102 in lieu of requesting and obtaining a server classification response 300. If a client cache validity period has passed for the cached content rating (Block 504), the monitor client 102 may ignore that cached content rating. The monitor client 102 may send a classification request of the webpage to the monitor server 108 (Block 508).

If the client cache 106 does not have a static server content rating stored for the webpage 104 being accessed (Block 502), the monitor client 102 may send a classification request of the webpage to the monitor server 108 (Block 508). The monitor client 102 may execute a real-time classification of at least one of a webpage image and a text content of the webpage 104 to determine the client content rating (Block 510). The monitor client 102 may generate a set of possible client content ratings for the webpage 104 (Block 512). The monitor client 102 may generate a set of client confidence scores associated with the set of possible client content ratings (Block 514). The client confidence score indicates the certainty of the monitor client 102 in that client content rating. The monitor client 102 may calculate the client content rating and the client confidence score as part of a single operation. The monitor client 102 may select any client content rating above a client confidence score threshold (Block 516)

The monitor client 102 may receive the server content rating of the webpage 104 from the monitor server 108 (Block 518). If the monitor client 102 receives a static server content rating from the monitor server 108 as the server content rating (Block 520), the monitor client 102 may use the static server content rating as the final content rating (Block 522). The monitor client 102 may store the static server content rating as a cached content rating in the client cache 106 (Block 524). If the server content rating is not the static server content rating (Block 520), the monitor client 102 may factor the client content rating with a server content rating of the webpage 104 to determine a final content rating for the webpage 104 (Block 526). The monitor client 102 may calculate the final content rating by applying rating specific thresholds to the client content rating and the server content rating. If the final content rating is above an upper content rating threshold (Block 528), the monitor client 102 may finalize the final content rating (Block 530). If the final content rating is below a lower content rating threshold (Block 532), the monitor client 102 may finalize the final content rating (Block 530). Otherwise, the monitor client 102 may execute an adjudication procedure to disambiguate an ambiguous content rating (Block 534). The monitor client 102 may then finalize the final content rating (Block 530).

Figure 6:
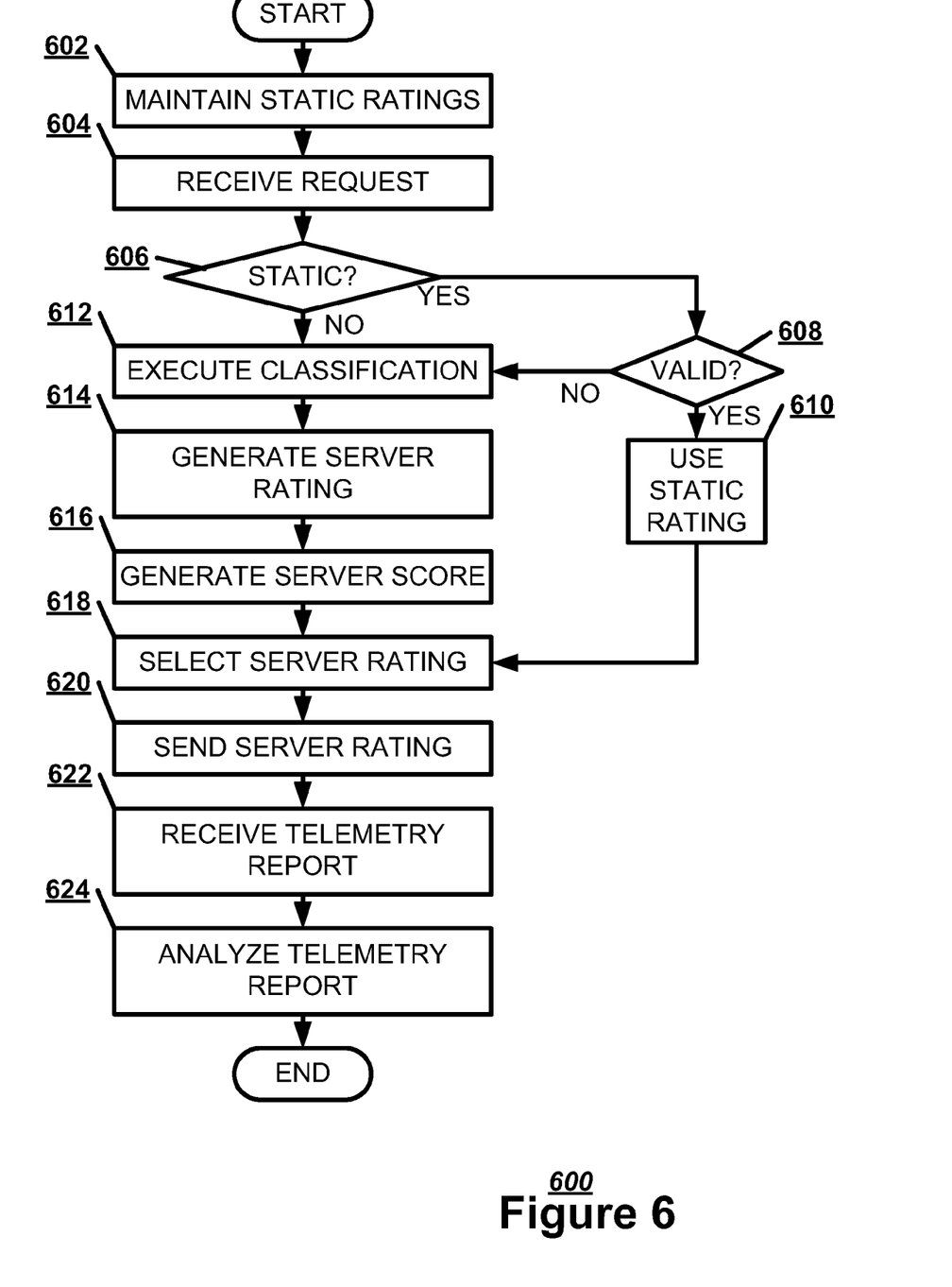
FIG. 6 illustrates, in a flowchart, one embodiment of a method of generating a server content rating at a monitor server.

FIG. 6 illustrates, in a flowchart, one embodiment of a method 600 of generating a server content rating at a monitor server 108. The monitor server 108 may maintain a static server content rating of known webpages (Block 602). The monitor server 108 may receive a classification request of the webpage 104 from the monitor client 102 (Block 604). If the monitor server 108 has maintained a static server content rating of the webpage 104 (Block 606), and the static server content rating is still within a server rating validity period (Block 608), the monitor server 108 may use the static server content rating as the server content rating (Block 610). The server rating validity period is a period of time during which a stored static server rating may be sent to a monitor client 102 in lieu of executing a classification of the webpage 104. If a server rating validity period has passed for the static server content rating (Block 608), the monitor server 108 may ignore that static server content rating. The monitor server 108 may execute a classification of the webpage 104 based on a uniform resource locator for the webpage 104 (Block 612).

If the monitor server 108 does not have a static server content rating of the webpage 104 (Block 606), the monitor server 108 may execute a classification of the webpage 104 based on a uniform resource locator for the webpage 104 (Block 612). The monitor server 108 may generate a set of possible server content ratings for the webpage 104 (Block 614). The monitor server 108 may generate a set of server confidence scores associated with the set of possible server content ratings (Block 616). The server confidence score indicates the certainty of the monitor server 108 in that server content rating. The monitor server 108 may calculate the server content rating and the server confidence score as part of a single operation. The monitor server 108 may select the server content rating with the top server confidence score (Block 618). The monitor server 108 may send the server content rating to a monitor client 102 for factoring with a client content rating of the webpage 104 to determine the final content rating for the webpage (Block 620).

The monitor server 108 may receive a telemetry report from the monitor client 102 (Block 622). The monitor server 108 may analyze the telemetry report for adjusting a future server content rating (Block 624). For example, if a client content rating and a server content rating conflict, the monitor server 108 may determine how to avoid such conflicts in the future. Additionally, if a guardian user has overridden the final content rating, the monitor server 108 may determine if the user override was due to a rating error, or if the guardian user had overridden a properly blocked site. Further, if the final content rating was ambiguous, the monitor server 108 may determine if the upper content rating threshold or lower content rating threshold may be adjusted. Also, the monitor server 108 may identify any server content rating that may be deemed static and stored as a static server content rating.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
generating using a monitor client a client content rating describing a real-time classification of dynamic webpage content for a webpage;
factoring using the monitor client the client content rating with a server content rating describing static webpage content of the webpage to determine a final content rating for the webpage based on a client confidence score describing certainty in the client content rating and a server confidence score describing certainty in the server content rating; and
storing in a client cache the server content rating as a cached content rating.

2. The method of claim 1, further comprising:
blocking access to the webpage based on the final content rating.

3. The method of claim 1, further comprising:
allowing access to the webpage based on the final content rating.

4. The method of claim 1, further comprising:
receiving the server content rating of the webpage from a monitor server.

5. The method of claim 1, further comprising:
receiving a static server content rating from a monitor server as the server content rating; and
using the static server content rating as the final content rating.

6. The method of claim 1, further comprising:
using the cached content rating as the final content rating.

7. The method of claim 1, further comprising:
ignoring the cached content rating after a client cache validity period has passed.

8. The method of claim 1, further comprising:
executing a real-time classification of at least one of a webpage image and a text content of the webpage to determine the client content rating.

9. The method of claim 1, further comprising:
calculating the client confidence score and the client content rating as part of a single operation.

10. The method of claim 1, further comprising:
generating a telemetry report on the final content rating to be sent to a monitor server.

11. A tangible machine-readable storage device having a set of instructions detailing a method stored thereon that when executed by one or more processors cause the one or more processors to perform the method, the method comprising:
generating using a monitor server a server content rating describing static webpage content for a webpage;
storing the server content rating in a static server content rating storage device; and
sending the server content rating to a monitor client for factoring with a client content rating describing dynamic webpage content of the webpage generated at the monitor client to determine a final content rating for the webpage based on a client confidence score describing certainty in the client content rating and a server confidence score describing certainty in the server content rating.

12. The tangible machine-readable storage device of claim 11, wherein the method further comprises:
receiving a classification request of the webpage from the monitor client.

13. The tangible machine-readable storage device of claim 11, wherein the method further comprises:
maintaining a static server content rating of a known webpage.

14. The tangible machine-readable storage device of claim 13, wherein the method further comprises:
ignoring the static server content rating after a server rating validity period has passed.

15. The tangible machine-readable storage device of claim 11, wherein the method further comprises:
executing a classification of a webpage based on a uniform resource locator.

16. The tangible machine-readable storage device of claim 11, wherein the method further comprises:
calculating the server confidence score and the server content rating as part of a single operation.

17. The tangible machine-readable storage device of claim 11, wherein the method further comprises:
   receiving a telemetry report from the monitor client.

18. The tangible machine-readable storage device of claim 17, wherein the method further comprises:
   analyzing the telemetry report for adjusting a future server content rating.

19. A computing device, comprising:
   a hardware communication interface configured to access a webpage and receives a server content rating with a server confidence score describing certainty in the server content rating;
   a hardware processor configured to generate a client content rating of dynamic webpage content for the webpage with a client confidence score describing certainty in the client content rating, to use the server content rating is a static server content rating, and to factor the server content rating with a client content rating of the webpage to determine a final content rating for the webpage when the server confidence score indicates a dynamic server content rating; and
   a client cache configured to store the static server content rating as a cached content rating.

20. The computing device of claim 19,
   wherein the cached content rating has a client cache validity period.

* * * * *